United States Patent
Swartling et al.

(10) Patent No.: US 8,744,703 B2
(45) Date of Patent: Jun. 3, 2014

(54) DETERMINATION OF ONE OR MORE GEARSHIFT POINTS

(75) Inventors: Fredrik Swartling, Södertälje (SE); Mikael Wågberg, Södertälje (SE); Mikael Öun, Norsborg (SE)

(73) Assignee: Scania CV AB (SE)

( * ) Notice: Subject to any disclaimer, the term of this patent is extended or adjusted under 35 U.S.C. 154(b) by 10 days.

(21) Appl. No.: 13/392,147

(22) PCT Filed: Sep. 10, 2010

(86) PCT No.: PCT/SE2010/050961
§ 371 (c)(1),
(2), (4) Date: Feb. 24, 2012

(87) PCT Pub. No.: WO2011/031219
PCT Pub. Date: Mar. 17, 2011

(65) Prior Publication Data
US 2012/0166054 A1      Jun. 28, 2012

(30) Foreign Application Priority Data
Sep. 14, 2009   (SE) ...................................... 0950655

(51) Int. Cl.
G06F 7/00        (2006.01)
G06F 17/00      (2006.01)
G06F 19/00      (2011.01)

(52) U.S. Cl.
USPC ................................ 701/55; 701/51; 477/97

(58) Field of Classification Search
USPC ........... 701/51, 52, 53, 54, 55, 66, 62, 56, 57, 701/58; 477/77, 78, 94, 98, 108, 115, 120, 477/71, 79, 97, 80, 65, 63, 62, 60, 154, 148, 477/146, 136, 129, 128; 74/70, 66, 62, 60, 74/57, 55, 54, 52, 51, 65, 58, 56
See application file for complete search history.

(56) References Cited

U.S. PATENT DOCUMENTS

| 4,852,006 A | 7/1989 | Speranza |
| 5,479,345 A | 12/1995 | Amsallen |

(Continued)

FOREIGN PATENT DOCUMENTS

| DE | 44 40 706 A1 | 5/1996 |
| DE | 10 2006 030899 A1 | 7/2007 |
| WO | WO 2009/009161 A1 | 2/2008 |
| WO | WO2008047602 A1 * | 4/2008 |

OTHER PUBLICATIONS

International Search Report dated Dec. 20, 2010, issued in corresponding international application No. PCT/SE2010/050961.

*Primary Examiner* — Khoi Tran
*Assistant Examiner* — Rachid Bendidi
(74) *Attorney, Agent, or Firm* — Ostrolenk Faber LLP

(57) ABSTRACT

A method, a system, a computer program and a computer program product for determining one or more shift points for a gearbox in a motor vehicle which comprises an engine connected to, in order to drive the gearbox. A shift point is defined by an engine speed at which the gearbox effects a downshift or upshift. The method uses one or more shift points determined on the basis of a change in road gradient.

15 Claims, 2 Drawing Sheets

(56) References Cited

U.S. PATENT DOCUMENTS

| | | |
|---|---|---|
| 6,246,942 B1 | 6/2001 | Dobler et al. |
| 6,496,767 B1* | 12/2002 | Lorentz .................. 701/55 |
| 6,652,418 B1* | 11/2003 | Gutknecht-Stohr et al. .. 477/120 |
| 7,463,962 B2* | 12/2008 | Brunemann et al. ............ 701/55 |
| 2004/0002806 A1* | 1/2004 | Bellinger .................. 701/104 |
| 2006/0155447 A1* | 7/2006 | Uken et al. .................. 701/50 |
| 2006/0293822 A1 | 12/2006 | Lattemann et al. |
| 2007/0093358 A1* | 4/2007 | Ayabe et al. .................. 477/97 |
| 2008/0027613 A1* | 1/2008 | Bai et al. .................. 701/55 |
| 2008/0228362 A1* | 9/2008 | Muller et al. .................. 701/54 |
| 2009/0018732 A1* | 1/2009 | Choby et al. .................. 701/51 |
| 2009/0036267 A1* | 2/2009 | Bellinger .................. 477/97 |
| 2010/0029442 A1* | 2/2010 | Ito .................. 477/183 |

* cited by examiner

DETERMINATION OF ONE OR MORE GEARSHIFT POINTS

CROSS-REFERENCE TO RELATED APPLICATIONS

The present application is a 35 U.S.C. §§371 national phase conversion of PCT/SE2010/050961, filed Sep. 10, 2010, which claims priority of Swedish Application No. 0950655-1, filed Sep. 14, 2009, the contents of which are incorporated by reference herein. The PCT International Application was published in the English language.

TECHNICAL FIELD

The present invention relates to a method for determining one or more shift points for a gearbox in a motor vehicle. The invention further relates to a system performing the method, a motor vehicle which comprises that system, and a computer program and a computer program product which implement the method according to the invention.

BACKGROUND TO THE INVENTION

FIG. 1 depicts schematically parts of a power train for a motor vehicle 1, such as a passenger car or a heavy vehicle, e.g. a truck or bus. The power train comprises an engine 10 mechanically connected by a shaft to a first end of a gearbox 20 via a clutch device 40. The gearbox 20 is also mechanically connected, at its other end, by a propeller shaft 50 to a differential gear 30 associated with a rear axle. The rear axle comprises respective left and right drive shafts 60 which drive the vehicle's powered wheels (not depicted in the diagram).

With this well-known arrangement, the mechanical work of the engine 10 is transmitted via various transmission devices, e.g. the clutch device 40, the gearbox 20, the propeller shaft 50, the differential gear 30 and the drive shafts 60, to powered wheels in order to move the vehicle 1. An important device in the power train is the gearbox 20, which has a number of forward gears for moving the vehicle 1 forwards, and usually also one or more reverse gears. The number of forward gears varies but modern kinds of trucks are usually provided with twelve forward gears.

The gearbox 20 may be of manual or automatic type (automatic gearbox), but also of the automatic manual gearbox type (automatic manual transmission, AMT).

Automatic gearboxes and automatic manual gearboxes are automated gearbox systems usually controlled by a control unit 110 (sometimes also called electronic control unit, ECU) which controls the gearbox 20, e.g. during gear changing, as when choosing appropriate gears at a certain vehicle speed with a certain running resistance. The ECU may measure engine speed and the state of the gearbox 20 and control the gearbox by means of solenoid valves connected to compressed air devices. Information about the engine 10, e.g. its speed and torque, is also sent from the engine 10 to the ECU, e.g. via a CAN (controller area network) bus.

The control unit 110 further comprises devices for receiving information, e.g. in the form of input signals, from the gearbox 20 via a connection 80 and/or from, for example, one or more input units 120 via a connection 90. The control unit further comprises devices for delivering information, e.g. in the form of control signals, to the gearbox 20 via a connection 70 and/or to one or more output units 130 via a connection 100. The control unit may be situated close to the driving cab or close to the gearbox or substantially anywhere in the vehicle 1. Input units 120 and/or output units 130 are with advantage situated so that they are reachable and/or viewable by a driver of the vehicle.

In conventional gear change systems, the control unit 110 uses tabulated engine speed limits when choosing appropriate gears. These engine speed limits are also called shift points and they represent the engine speed at which a downshift or upshift should be effected in the gearbox 20. This means that the vehicle 1 changes gear when the speed of its engine 10 passes a speed represented by a shift point. The shift points are therefore to be construed as providing information not only about when a downshift or upshift should take place but also about the number of gear steps to be effected at each downshift or upshift. It is usual for each shift point to comprise one to three gear steps, but more steps are possible, e.g. one to six.

FIG. 2 depicts schematically an example of various tabulated shift points represented by lines SP1-SP6 in a graph where the x axis represents engine torque and the y axis the speed of the engine 10 in revolutions per minute (rpm). So long as the engine speed is between shift lines SP1 and SP4 no gear change takes place, but if it rises above an upshift line, SP1-SP3, an upshift is initiated, and similarly a downshift is initiated if the engine speed drops below a downshift line SP4-SP6. Table 1 below shows a number of upward or downward gear steps for each of the lines SP1-SP6. For example, an upshift by one step takes place if the engine speed rises above line SP1 and a downshift by two steps if the engine speed drops below line SP5.

TABLE 1

| Downshift and upshift lines SP1-SP6 | |
| --- | --- |
| SP1 | Engine speed for upshift by 1 step |
| SP2 | Engine speed for upshift by 2 steps |
| SP3 | Engine speed for upshift by 3 steps |
| SP4 | Engine speed for downshift by 1 step |
| SP5 | Engine speed for downshift by 2 steps |
| SP6 | Engine speed for downshift by 3 steps |

Shift point choices affect inter alia running characteristics, acceleration, comfort and fuel consumption for the vehicle 1, so shift points have to be accurately calibrated by vehicle manufacturers. This calibration involves various gearshift strategies being tested in the field in different driving situations, e.g. with different amounts of acceleration applied, different road gradients and different vehicle-combination weights. The test results have then to be thoroughly analysed to determine appropriate shift points. This procedure for calibration of shift points is both time-consuming and expensive. Moreover, the results of the calibration are not always satisfactory in that the calibrated shift points may be appropriate for certain driving situations but less so for others. In certain driving situations, particularly if basic conditions change, the previously known methods for choice of shift points therefore result in non-optimum running characteristics.

BRIEF DESCRIPTION OF THE INVENTION

An object of the present invention is to propose an alternative method and an alternative system for determining one or more shift points for a gearbox which totally or partly solve the above problem.

According to an aspect of the invention, the above objects are achieved with a method according to the invention for determining one or more shift points for a gearbox in a motor vehicle which comprises an engine connected to drive the gearbox, wherein a shift point is defined by an engine speed at which the gearbox effects a downshift or upshift. The method comprises the one or more shift points being determined on the basis of a change in road gradient.

The invention further relates to a computer program comprising program code which, when the program code is executed in a computer, causes the computer to effect the method disclosed herein, and a computer program product comprising a computer-readable medium and the computer program.

According to another aspect of the invention, said objects are achieved with a system hereof for determining one or more shift points, comprising at least one control unit for controlling a gearbox in a motor vehicle. That vehicle comprises an engine connected to drive the gearbox. A shift point is defined by an engine speed at which the gearbox effects a downshift or upshift. The system further determines the one or more shift points on the basis of a change in a road gradient.

The system according to the invention may also be modified according to the various embodiments of the above method. The invention further relates to a motor vehicle which comprises at least one system as above.

A method and a system according to the invention result in a flexible and more exact determination of the one or more downshift and upshift points. The fact that the shift points are determined on the basis of a change in road gradient makes it possible for them to be determined so that they are adjusted to both current and future running resistances to the vehicle. The settings of the one or more downshift and upshift points can thereby be optimised so that fuel consumption decreases and running characteristics are improved.

Using the invention also results in a gear choice strategy whereby fewer gear changes which later turn out to be incorrect are effected. The vehicle will stay longer in a lower gear when beginning to climb a hill, leading to maintaining in many situations a higher running speed and greater traction force at the beginning of the climb. The result, in combination with fewer incorrect gear changes, is that the driver has a positive driving experience and the vehicle is felt to have an intelligent gear change strategy.

Further advantages and applications of a method and a system according to the invention are indicated by the detailed description set out below.

BRIEF DESCRIPTION OF THE DRAWINGS

In the detailed description of the present invention set out below, embodiments of the invention are described with reference to the attached drawings, in which.

DETAILED DESCRIPTION OF THE INVENTION

Figure 1:
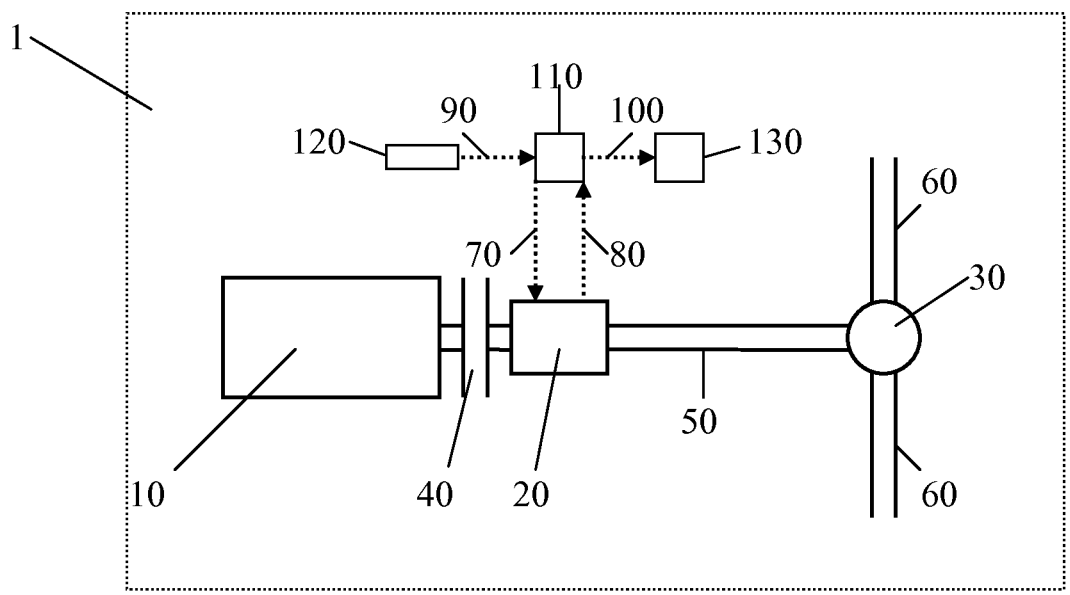
FIG. 1 depicts schematically part of a power train for a motor vehicle.
Figure 2:
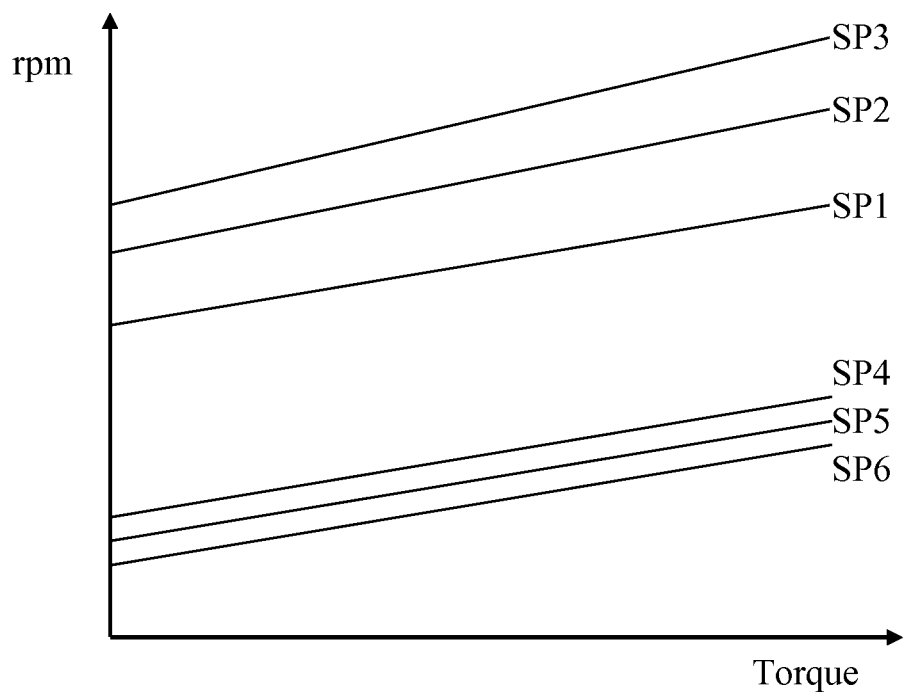
FIG. 2 is a graph of downshift and upshift lines.

The present invention relates to determination of one or more shift points for a gearbox 20 situated preferably in a motor vehicle 1. A downshift or upshift represents an engine speed at which the gearbox 20 is respectively adapted to effecting a downshift or upshift. The engine speed for upshift points is higher than the engine speed for downshift points. As indicated above, the shift points comprise information both about when, i.e. at what engine speed and torque, a downshift or upshift should take place and about how many gear steps should be taken at each downshift or upshift.

The gearbox 20 is preferably of the kind which forms part of an automated gearbox system controlled by a control unit 110, e.g. an ECU. In such a system, gear changes are effected automatically by the control unit 110 but there are also systems whereby the driver can execute manual gear changes in such an automatic gear system, what is known as manual gear change in automatic state (automatic mode). The gearbox 20 also has a plurality of gears, e.g. twelve forward gears and one or more reverse gears are usual in modern trucks.

According to the invention, the downshift and upshift points are determined on the basis of a change in the road gradient. Road gradient here and throughout this specification means a gradient of the road in a direction in which the vehicle 1 is travelling. Thus the gradient of the road has an influence on the running resistance to the vehicle 1, depending on whether the vehicle is, for example, on a downgrade, on level ground or on an upgrade.

The invention takes the change in this road gradient into account in determining the downshift and upshift points, which means that they are adaptively adjusted over time to suit the prevailing road characteristics at each time. The invention utilises the fact that road curvatures are relatively regular and predictable. This approach reduces the risk of the control unit 110 causing the gearbox 20 to change to a gear not appropriate to the conditions which prevail after the gear change has been effected. For example, it reduces the risk of the vehicle changing up and thereafter being unable, because the road gradient changes to a steeper upgrade after the upshift has begun, to run in the new gear after the gear change has been effected. In previously known systems such a situation would lead to a downshift having to be effected immediately after the upshift, thereby increasing wear and reducing ride comfort.

According to an embodiment of the invention, the one or more shift points are also determined on the basis of a time period T defined as a calculated time taken to effect a gear change. The time period T represents here and throughout this specification the time from when the gear change is initiated to when it is completed. The time period T is used here in the determination of the one or more shift points by predicting the road gradient after the downshift or upshift. This entails predicting the nature of the road gradient after the time period T, i.e. after the gear change has been effected, which is possible in that the curvature of the road will be substantially regular. The result is a more exact estimate of the running resistance which the vehicle 1 will encounter after the gear change, and hence a more exact determination of the one or more shift points.

Each of the downshift and upshift points may respectively comprise one or more downward or upward gear steps, so each of the respective downshifts and upshifts corresponding to these points may also respectively comprise one or more downward or upward gear steps. Thus on occasion of an upshift, for example, more than one step may be taken between the available forward gears if the engine speed passes a shift point which comprises more than one downward or upward gear step. According to an embodiment of the invention, the number of downward or upward gear steps respectively involved in a downshift or upshift is a function of the change in the road gradient, this change being defined as a current road gradient derivative $\Delta$ in the vehicle's direction of movement.

This function for the number of downward or upward gear steps involved takes into account, according to an embodiment of the invention, the absolute amount of the current road gradient derivative $\Delta$. If this absolute amount assumes a larger value than a threshold value $\Delta_T$, the function results in the downshifts or upshifts having respectively to comprise more than one downward or upward gear step. This embodiment thus makes it possible for the road gradient derivative Δ, calculated with low complexity, in the direction of movement of the vehicle 1 to be used for determining how many gear steps have to be taken for a gear change to be allowed. The advantage afforded by single-step gear changes being barred is reducing the likelihood of a gear change without having to affect the shift points for the gear changes which are nevertheless effected.

According to an embodiment of the invention, the road gradient derivative Δ is determined by calculation and/or measurement and/or map data. Calculation may be based on various different parameters, e.g. changes in running resistance or fuel consumption. Measurement may for example be by means of one or more sensors over time. Map data, particularly topology data, may be used in conjunction with, for example, a position determining device, e.g. a GPS (global positioning system) device, to determine the road gradient derivative Δ. The road gradient derivative Δ may be defined either as change in road gradient with respect to time or as change in road gradient with respect to distance travelled. In applications which predict a road gradient after changing gear, it is advantageous to use the road gradient derivative with respect to time, since how much time a gear change takes is known but how long a distance the vehicle 1 will travel during the course of a gear change is not known.

The threshold value $Δ_T$ may be a predetermined value set at the time of assembling or servicing of the vehicle. Its magnitude may vary depending on characteristics of the engine 10 or of the gearbox 20 or on other parameters in the power train of the vehicle 1. The magnitude of the threshold value $Δ_T$ may also be set according to, for example, the topology in which the vehicle 1 will be used, so that different values for the threshold value $Δ_T$ are set depending on whether the vehicle will be run in relatively flat country or in mountainous country.

The threshold value $Δ_T$ is calculated according to an embodiment of the invention in real time, in which case it is calculated in the vehicle 1, e.g. in the control unit 110. This real time calculation of the threshold value $Δ_T$ results in extremely adaptable determination of shift points and hence very exact gear changing.

According to an embodiment of the invention, the one or more shift points are calculated in real time. This calculation may be based on an estimate or prediction of how the vehicle's speed changes in the course of a downshift or upshift. This involves analysing, for example, how often the vehicle comes to a halt, or is assumed to come to a halt, during the time period T, and this halting is used to adjust the shift points.

Specialists will appreciate that a method for determination of one or more shift points according to the present invention might also be implemented in a computer program which, when executed in a computer, causes the computer to effect the method. The computer program is contained in a computer program product's computer-readable medium which takes the form of a suitable memory, e.g. ROM (read-only memory), PROM (programable read-only memory), EPROM (erasable PROM), flash memory, EEPROM (electrically erasable PROM), hard disc unit, etc.

The present invention relates also to a system for determination of one or more shift points, comprising at least one control unit adapted to controlling a gearbox 20 in a motor vehicle 1 which comprises an engine 10 connected to, in order to drive, said gearbox 20. The gearbox 20 is controlled by a control unit 110 and is an automatic gearbox or an automated manual gearbox comprising a plurality of gears. A shift point is here defined by an engine speed at which said gearbox 20 is adapted to effecting a downshift or upshift. According to the invention, the system is adapted to determining said one or more shift points on the basis of a change in a road gradient.

Figure 3:
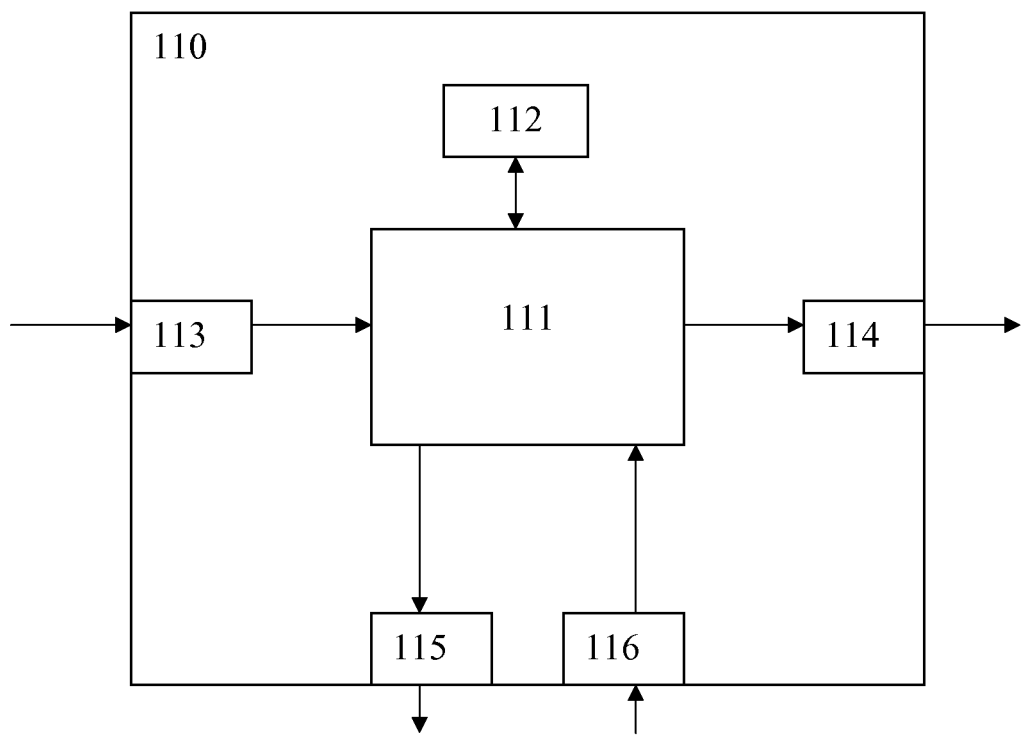
FIG. 3 depicts a control unit forming part of a system according to the invention.

FIG. 3 depicts schematically a control unit 110. The control unit 110 comprises a calculation unit 111 which may take the form of substantially any suitable type of processor or microcomputer, e.g. a circuit for digital signal processing (digital signal processor, DSP) or a circuit with a predetermined specific function (application specific integrated circuit, ASIC). The calculation unit 111 is connected to a memory unit 112 which is incorporated in the control unit 110 and which provides the calculation unit 111 with, for example, the stored program code and/or the stored data which the calculation unit 111 needs for it to be able to perform calculations. The calculation unit 111 is also adapted to storing partial or final results of calculations in the memory unit 112.

The control unit 110 is further provided with devices 113, 114, 115, 116 for respectively receiving input signals and sending output signals. These input and output signals may comprise waveforms, pulses or other attributes which the signal receiving devices 113, 116 can detect as information and which can be converted to signals which are processable by the calculation unit 111. The calculation unit 111 is then provided with these signals. The signal sending devices 114, 115 are adapted to converting signals received from the calculation unit 111 in order to create, eg by modulating the signals, output signals which may be transmitted to other parts of the system for determination of one or more shift points.

Each of the connections to the devices for respectively receiving input signals or sending output signals may take the form of one or more of the following: cable, data bus, e.g. CAN (controller area network) bus, MOST (media orientated systems transport) bus or some other bus configuration, or a wireless connection. The connections 70, 80, 90, 100 in FIG. 1 may also take the form of one or more of these cables, buses or wireless connections.

One skilled in the art will appreciate that the aforesaid computer may take the form of the calculation unit 111 and that the aforesaid memory may take the form of the memory unit 112.

Specialists will also appreciate that the above system may be modified according to the various embodiments of the method according to the invention. The invention relates also to a motor vehicle 1, e.g. a truck or bus, which comprises at least one system for determination of one or more shift points according to the invention.

Finally, the present invention is not limited to its embodiments described above, but relates to and comprises all embodiments within the scope of protection of the attached independent claims.

The invention claimed is:

1. A method for determining one or more shift points for a gearbox in a motor vehicle wherein the vehicle comprises an engine connected to drive the gearbox, the method comprising:

defining a shift point by an engine speed at which the gearbox effects a downshift or an upshift, such that the downshift or the upshift comprises respectively a number of downward or upward gear steps; and determining, by a control unit comprising a data processor, the shift point based on a change in road gradient, wherein the number of downward or upward gear steps is a function of the change in the road gradient, wherein the change in the road gradient is defined as a current road gradient derivative $\Delta$ in a direction of movement of the motor vehicle.

2. The method according to claim 1, wherein when an absolute value of the current road gradient derivative $\Delta$ is greater than a threshold value $\Delta_T$, then the downshift or upshift comprises respectively more than one downward or upward gear steps.

3. The method according to claim 2, wherein the threshold value $\Delta_T$ is a value calculated in real time.

4. The method according claim 1, further comprising determining the current road gradient derivative $\Delta$ by calculation, measurement or map data.

5. The method according claim 1, further comprising determining the one or more shift points also based on a time period T defined as a calculated period of time for a gear change selected in order to predict the road gradient that prevails after the downshift or upshift.

6. The method according to claim 1, further comprising calculating one or more shift points in real time.

7. The method according to claim 6, wherein the calculating of the one or more shift points is based on an estimate of a change in a speed of the vehicle during a course of a downshift or an upshift.

8. The method according to claim 1, further comprising controlling the gearbox by a control unit, wherein the gearbox is an automatic gearbox or an automated manual gearbox comprising a plurality of gears, and the vehicle is a truck or a bus.

9. A non-transitory computer-readable medium comprising a program of instructions configured to cause a processor to execute the method according to claim 1.

10. A non-transitory computer-readable medium according to claim 9, wherein the computer-readable medium is selected from the group consisting of ROM (read-only memory), PROM (programable ROM), EPROM (erasable PROM), flash memory, EEPROM (electrically erasable PROM) and hard disc unit.

11. A system for determining one or more shift points in a gearbox of a motor vehicle with an engine connected to a gearbox, the system comprising:
at least one control unit configured and operable to control the gearbox in the motor vehicle to drive the gearbox,
wherein a shift point is defined by an engine speed at which the gearbox is configured and operable to effect a downshift or an upshift,
wherein the downshift or the upshift comprises respectively a number of downward or upward gear steps,
the system being configured and operable to determine the one or more shift points on the basis of a change in a road gradient, and
wherein the number of downward or upward gear steps is a function of the change in road gradient, wherein the change is defined as a current road gradient derivative $\Delta$ in the direction of movement of the motor vehicle.

12. A motor vehicle comprising at least one system according to claim 11.

13. A method according to claim 2, wherein the threshold value $\Delta_T$ is a value set in advance of the determining the change in the road gradient.

14. A method according to claim 1, further comprising: comparing an absolute value of the current road gradient derivative $\Delta$ to a threshold value $\Delta_T$; and
determining the shift point so as to effect the upshift or downshift only when the absolute value of the current road gradient derivative $\Delta$ exceeds the threshold value $\Delta_T$, such that the downward gear shift comprises at least two downward gear steps and the upward gear shift comprises at least two upward gear steps.

15. A method of determining one or more shift points for a gearbox in a motor vehicle comprising an engine connected to drive the gearbox, the method comprising:
defining a shift point by an engine speed at which the gearbox effects a downshift or an upshift, such that the downshift or the upshift comprises, respectively, a number of downward or upward gear steps;
determining, by a control unit comprising a data processor, the shift point based on a change in road gradient, the change in the road gradient being a current road gradient derivative $\Delta$ in a direction of movement of the motor vehicle; and
controlling automatically the motor vehicle according to the determining of the shift point,
wherein the number of downward or upward gear steps is a function of the change in the road gradient.

* * * * *